United States Patent
Kwag et al.

(10) Patent No.: US 9,406,979 B2
(45) Date of Patent: Aug. 2, 2016

(54) SECONDARY BATTERY

(75) Inventors: Nohyun Kwag, Yongin-si (KR);
Youngcheol Jang, Yongin-si (KR)

(73) Assignee: Samsung SDI Co., Ltd., Giheung-gu, Yongin-si, Gyoenggi-do (KR)

( * ) Notice: Subject to any disclaimer, the term of this patent is extended or adjusted under 35 U.S.C. 154(b) by 1780 days.

(21) Appl. No.: 12/071,401

(22) Filed: Feb. 20, 2008

(65) Prior Publication Data

US 2008/0226972 A1 Sep. 18, 2008

(30) Foreign Application Priority Data

Mar. 16, 2007 (KR) .......................... 10-2007-0026127

(51) Int. Cl.
*H01M 4/02* (2006.01)
*H01M 10/42* (2006.01)
*H01M 2/02* (2006.01)

(52) U.S. Cl.
CPC ............ *H01M 10/42* (2013.01); *H01M 2/0207* (2013.01); *H01M 10/425* (2013.01)

(58) Field of Classification Search
USPC ......... 429/7, 163, 121, 175, 174, 177, 61, 65, 429/161, 178, 181, 185
See application file for complete search history.

(56) References Cited

U.S. PATENT DOCUMENTS

| | | | |
|---|---|---|---|
| 7,887,948 B2 * | 2/2011 | Jang et al. | 429/163 |
| 8,252,453 B2 * | 8/2012 | Jang et al. | 429/163 |
| 2004/0126651 A1 * | 7/2004 | Kim et al. | 429/61 |
| 2004/0137314 A1 * | 7/2004 | Fukui | 429/62 |
| 2005/0181242 A1 * | 8/2005 | Suzuki et al. | 429/7 |
| 2005/0221175 A1 * | 10/2005 | Yoon | 429/164 |
| 2008/0057383 A1 * | 3/2008 | Seo et al. | 429/122 |
| 2008/0096101 A1 * | 4/2008 | Kwag et al. | 429/121 |
| 2008/0226973 A1 | 9/2008 | Jang et al. | |
| 2010/0251540 A1 * | 10/2010 | Seo | 29/623.4 |
| 2010/0323238 A1 * | 12/2010 | Takahashi et al. | 429/179 |

FOREIGN PATENT DOCUMENTS

| KR | 10-2004-0058915 | 7/2004 |
| KR | 10-2004-0110598 | 12/2004 |

* cited by examiner

*Primary Examiner* — Raymond Alejandro
(74) *Attorney, Agent, or Firm* — Robert E. Bushnell, Esq.

(57) ABSTRACT

A secondary battery capable of assembling a bare cell and a protective circuit module (PCM) in a manner of mechanical connection without performing a molding is provided. The secondary battery includes a bare cell whose top surface is provided with an electrode terminal having a polarity, a first case covering the top surface of the bare cell, a second case covering a first side surface of the bare cell, a first lead tab coupling the electrode terminal to the PCM, and a second lead tab coupling a surface of the bare cell having another polarity to the protective circuit module. Both of the first and the second lead tabs are covered by the first case.

15 Claims, 6 Drawing Sheets

SECONDARY BATTERY

CLAIM OF PRIORITY

This application makes reference to, incorporates the same herein, and claims all benefits accruing under 35 U.S.C §119 from an application earlier filed in the Korean Intellectual Property Office on the 16 Mar. 2007 and there duly assigned Serial No. 10-2007-0026127.

BACKGROUND OF THE INVENTION

1. Field of the Invention

The present invention relates to a secondary battery, and more particularly to an inner pack type of a secondary battery capable of assembling a bare cell and a protective circuit module (PCM) in manner of a mechanical connection without performing a molding so that the assembly of the bare cell and the protective circuit module (PCM) can easily be performed as well as, if necessary, the disassembly and reassembly of the bare cell and the protective circuit module (PCM) can be performed, and at the same time their works can easily be performed.

2. Description of the Related Art

Generally, a secondary battery is capable of being charged and discharged unlike a primary battery that is not capable of being charged. The secondary battery has widely been used in small advanced electronic equipments such as a cellular phone, a PDA, a notebook computer, etc. In particular, since a lithium secondary battery has operating voltage of 3.6V that is 3 times higher than a nickel-cadmium battery or a nickel-hydrogen battery largely used as a power supply for electronic equipment and has high energy density per unit weight, the use of the battery rapidly increases.

Such a lithium secondary battery mainly uses lithium-based oxide as a positive electrode active material and carbon material as a negative electrode active material. And, the lithium secondary battery is manufactured in various types. As representative types, there may be a cylindrical type, a prismatic type, and a pouch type.

The configuration of the lithium secondary battery will briefly be described based on the prismatic type. The prismatic type of secondary battery includes a jelly-roll type of electrode assembly, which is formed by stacking and winding a positive electrode plate and a negative electrode plate with a separator interposed therebetween, a can having one side open to receive the electrode assembly, and a cap assembly sealing the open side of the can. Herein, the structure, which includes the electrode assembly, the can, and the cap assembly, is usually referred to as a bare cell. Such a bare cell may be considered one independent secondary battery.

The structure in which protective circuit module (PCM) is assembled into the bare cell is usually referred to as a core pack. Also, the secondary battery used for small electronic equipments, such as a cellular phone, a PDA, a digital camera, etc. is usually used in a form of a battery pack. Such a battery pack is made by packing the core pack including protective circuit module (PCM) and the bare cell through a molding and then wrapping them with a label, or is made by inserting the core pack in an outer case, which is usually referred to as a hard case.

Recently, a compatible built-in batter pack (hereinafter referred to as an inner pack), which is designed in a relatively simple form, is widely used for various kinds of small electronic equipments.

A general form of the inner pack is formed by disposing a PCM on a relatively long side of the bare cell and connecting the bare cell and the PCM through electrical connection member, and then molding the bare cell and the PCM with molding resin.

A process of molding the bare cell and the PCM by means of an insert injection molding will briefly be explained below. The process includes disposing the core pack, in which the bare cell and the PCM are electrically connected, in a molding space of a mold formed of an upper metallic mold and a lower metallic mold, and then injecting molding resin through an inlet of the upper metallic mold. Then, the injected molding resin is solidified to form a molding part.

However, as the conventional inner pack described above is molded with the molding resin for connecting the bare cell with the PCM, it should be subject to a troublesome working process of mounting the core pack in the metallic mold, injecting the molding resin in the molding space of the metallic mold, and separating the inner pack in which the molding part is formed from the metallic mold by means of the solidification of the molding resin.

Herein, since the molding resin once injected in the molding space can not be recovered again, the high accuracy of the process of injecting the molding resin is required, thereby causing difficulty in processing. And, even though high accuracy of the injection of the molding resin could be maintained, non-uniform injection cannot be prevented due to the characteristics of the molding resin, which is amorphous. Therefore, due to the defect of the molding part, the defective rate of the inner pack increases. Further, since the molding part in a viscous state is integrally formed with the core pack when the molding part is defectively molded, it is very difficult to perform a reworking.

Since the molding resin is injected in the molding space of the metallic mold at relatively high pressure, the high pressure to the molding resin is transferred to the core pack so that the arrangement of the bare cell and the PCM is disturbed, causing defect and misalignment.

Also, the molding resin shrinks in a solidification process. Therefore, if the molding resin is not uniformly injected in the molding space, the shrinkage of the molding resin is greater at a specific portion than other portions. This non-uniform shrinkage causes problems that the surface of the molding part becomes irregular and the specific portion collapses. Thereby, this problem causes the appearance defect of the inner pack as well as frequent contact defect while the completed inner pack contacts the electronic equipment.

SUMMARY OF THE INVENTION

The present invention suggests a solution for above mentioned problems. It is an aspect of the present invention to provide a secondary battery capable of achieving an assembly structure including an electrical connection of a bare cell with a protective circuit module (PCM) through manner of a mechanical assembly so that the assembly of the bare cell and the PCM can easily be performed as well as if necessary, the disassembly and reassembly of the bare cell and the PCM can be performed, and at the same time their works can easily be performed.

It is another aspect of the present invention to provide a secondary battery capable of achieving an assembly structure of a bare cell and a PCM in manner of a mechanical assembly through a separately manufactured case so that defect rate after completion can considerably decrease.

It is still another aspect of the present invention to provide a secondary battery capable of improving structural integrity of a pack, since a bare cell and a PCM including a protective circuit board does not deform from the initial arrangement during a pack process.

In order to achieve the aspects, there is provided a secondary battery including a bare cell having a top surface and a first side surface where the top surface is provided with an electrode terminal having a polarity, a first case covering the top surface, a second case covering the first side surface and including a protective circuit module, a first lead tab coupling the electrode terminal to the protective circuit module, and a second lead tab coupling a surface of the bare cell having another polarity to the protective circuit module, both of the first and the second lead tabs being covered by the first case.

The bare cell may have a bottom surface that faces the top surface, a second side surface that faces the first side surface, a front surface, and a back surface that faces the front surface. The electrode terminal may be electrically insulated from the top surface. Each of the front and the back surfaces may be wider than any of the top, bottom, first side, and second side surfaces.

The second case may include a first case part covering the first side surface, and a second case part covering the bottom surface of the bare cell. The second case part may include a base part that is substantially parallel to the bottom surface, and a side wall part that is substantially parallel to the front surface. The side wall part of the second case part covers an edge portion of the front surface. The first case may include a base part that is substantially parallel to the top surface, and a side wall part that is substantially parallel to the front surface. The side wall part of the first case covers an edge portion of the front surface.

Each of the first and second lead tabs may extend substantially parallel to the top surface. The first lead tab may include an insulating layer for preventing short circuit between the first and the second lead tabs. The insulating layer may be formed to enclose the first lead tab. An insulating layer may be formed to enclose both of the first and the second lead tabs. The insulating layer, however, separates the first lead tab from the second lead tab.

One of the first and second lead tabs may include a bending section that shifts the one of the first and second lead tabs away from another of the first and second lead tabs.

The secondary battery may further include a label that covers the front and the back surface of the bare cell. The label may cover a portion of the first case and a portion of the second case.

The protective circuit module may be mounted in an inner side of the second case through an insert injection molding.

The second case may be coupled to the bare cell by a double sided tape. The first case may be coupled to the bare cell by a double sided tape.

The second case may be connected to the first case. The second case may include a coupling part formed at one end of the second case. The coupling part may have a coupling groove. The depth of the coupling groove is substantially the same as a thickness of one end of the first case. The second case is connected to the first case in a manner that the one end of the first case fits into the coupling groove of the second case.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, the embodiment of the present invention will be described in more detail with reference to the accompanying drawings.

Figure 1:
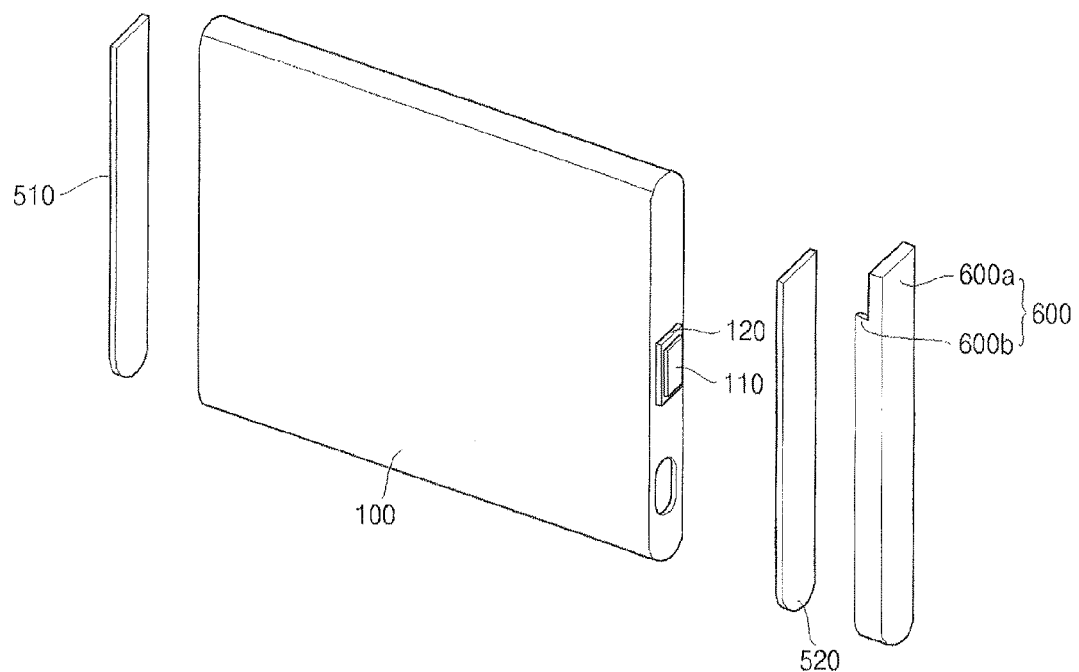
FIG. 1 is an exploded perspective view showing one exemplary embodiment of a secondary battery according to the present invention.
Figure 2:
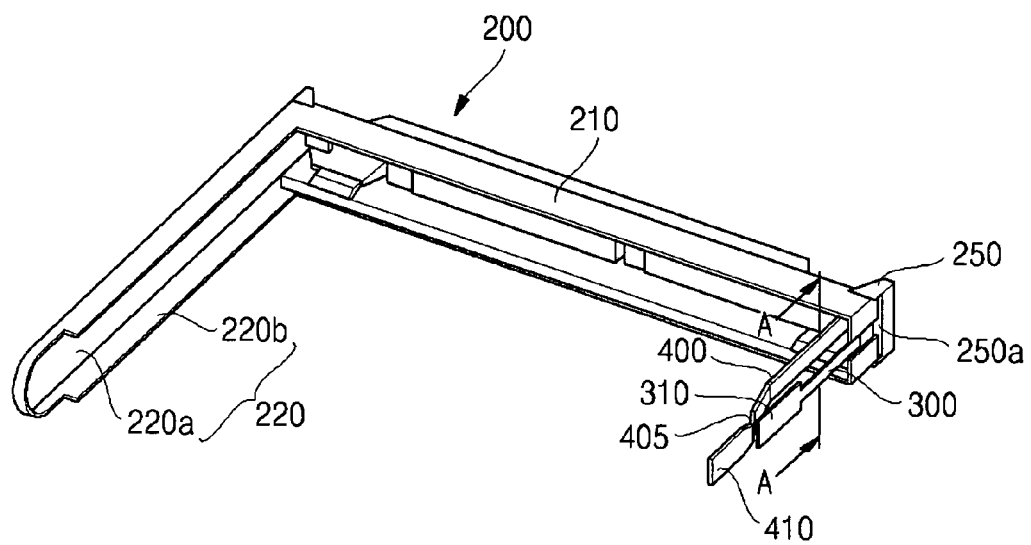
FIG. 2 is another perspective view of main parts of FIG. 1.
Figure 3:
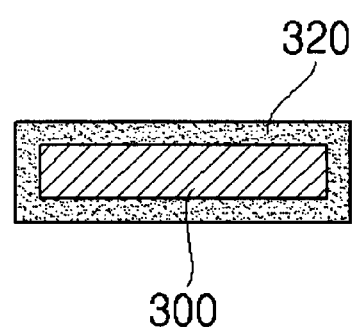
FIG. 3 is a cross-sectional view taken along line A-A of FIG. 1.
Figure 4:
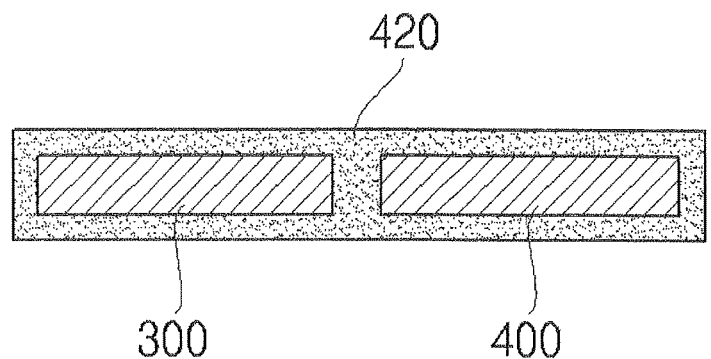
FIG. 4 is a cross-sectional view showing other exemplary embodiment of an insulating layer for a lead tab of the secondary battery according to the present invention.

FIG. 1 is an exploded perspective view showing one exemplary embodiment of a secondary battery of the present invention, FIG. 2 is another perspective view of main parts of FIG. 1, FIG. 3 is a cross-sectional view taken along line A-A of FIG. 1, and FIG. 4 is a cross-sectional view showing other exemplary embodiment of an insulating layer for a lead tab of the secondary battery of the present invention. And, FIGS. 5 to 8 are perspective views sequentially showing an assembly process of the secondary battery shown in the exemplary embodiment of FIG. 1.

Referring to FIGS. 1 through 4, a secondary battery of the present invention includes a bare cell 100, a second case 200, a first case 600, a first lead tab 300, and a second lead tab 400. The bare cell 100 is able to be charged and discharged. The bare cell 100 may have a shape having four narrow sides and two wide surfaces facing each other, but the shape of the bare cell 100 of the present invention is not limited thereto. Any one of the four narrow sides of the bare cell 100 can be coupled with an electrode terminal 110. Specifically, the bare cell 100 includes a front surface, a back surface that faces the front surface, a top surface, a bottom surface that faces the top surface, and two side surfaces (a first and a second side surfaces) that face each other. The front and back surfaces are relatively wider than the top, bottom, and two side surfaces. The electrode terminal 110 is formed on the top surface. At this time, the electrode terminal 110 is coupled to the bare cell 100 being insulted from the surfaces of the bare cell 100. The electrode terminal 110 is formed on the top surface of the bare cell 100 in a manner that an insulating gasket 120 is interposed on the circumference of the electrode terminal 110, and the electrical insulation between the electrode terminal 110 and the surfaces of the bare cell 100 is achieved by means of the insulation gasket 120. The configuration of the bare cell 100 has been applied to a general secondary battery. Therefore, detailed descriptions of configuration thereof will be omitted, and brief descriptions for the configuration thereof will be given below.

The bare cell 100 includes an electrode assembly, which is formed by stacking a positive electrode plate and a negative electrode plate with a separator interposed therebetween, a can having one open side to receive the electrode assembly through the open side, and a cap assembly sealing the open side of the can. The cap assembly includes a cap plate so that the cap plate seals the open side of the can. The cap plate is provided with an electrode terminal that is electrically insulated from other part by means of an insulation gasket. Herein, the can and the cap plate form an outer case of the bare cell.

The first case 600 covers a surface of the bare cell 100 coupled with the electrode terminal of the bare cell. In the present embodiment, the first case 600 is coupled to the top surface of the bare cell 100 on which the electrode terminal 110 is formed. The second case 200 covers at least a surface of the bare cell 100 that is not coupled with the electrode terminal 110 of the bare cell 100. In the present embodiment, the second case 200 covers the bottom surface and one of the side surfaces of the bare cell 100, both of which are not coupled to the electrode terminal 110. Accordingly, the three surfaces of the bare cell 100 are covered by means of the first case 600 and the second case 200. Preferably, the first case 600 and the second case 200 are manufactured with an injection molding using the same material so that they are harmonized well in their appearance or other different aspects.

The configuration of the second case 200 will be described in more detail. The second case 200 includes a first case part 210 and a second case part 220. A first case part 210 is vertically connected to a second case part 220. Therefore, the second case 200 is overall formed in a L-shape. The first case part 210 covers a side surface of the bare cell 100, and the second case part 220 covers the bottom surface of the bare cell 100 that faces the top surface that is coupled to the electrode terminal 110 of the bare cell 110. A protective circuit module (PCM) 230 including a protective circuit for the bare cell 100 is mounted on an inner side of the second case part 220. The PCM 230 includes a printed circuit board on which several electronic elements is mounted.

The mount of the PCM 230 in the second case 200 can be achieved by means of an insert injection molding. In other words, while the PCM is disposed in a molding space of a mold, molding resin is injected into the molding space of the mold to mold the second case, so that the second case and the PCM are integrally formed. Herein, the insert injection molding is performed in a manner that an external terminal 240 of the PCM 230 can be exposed to outside through the second case 200.

The coupling of the first case 600 and the second case 200 to the bare cell 100 is performed by means of double-sided tapes 510 and 520. However, the present invention is not limited to the use of the double-sided tapes. Therefore, the coupling thereof may be achieved by means of other coupling means other than the double-sided tapes.

The inner sides of the first case 600 and the second case 200 may be formed to receive the surfaces of the bare cell 100. Describing the second case part 220 of the second case 200 as an example, the second case part 220 includes a base part 220a corresponding to the bottom surface of the bare cell 100 and a side wall part 200b protruded from an edge of the base part 220a towards the bare cell 100. Therefore, a receiving space having one side closed by the base part 220a is formed inside the side wall part 220b. Therefore, the second case part 220 is coupled to the bare cell 100 in a manner that the bottom surface of the bare cell 100 is received in the receiving space inside the side wall part 220b. The first case 600 is also formed to include a base part 600a and a side wall part 600b so that it is coupled to the bare cell 100 in a manner that the top surface of the bare cell 100 is received in the receiving space inside the side wall part 600b of the first case 600.

One end of the second case 200 is provided with a door shape coupling part 250 for connecting the first case 600, wherein the inner side of the coupling part 250 is provided with a coupling groove 250a. The coupling groove 250a is formed on a surface of the coupling part 250 that is substantially parallel to the first case 600 or to the top surface of the bare cell 100. A depth of the coupling groove 250a is a distance from the surface to the bottom of the groove. It is preferable that the first case 600 is connected to one end of the second case 200 in a manner that one end of the first case 600 is inserted into the coupling groove 250a of the coupling part 250 of the second case 200. In other words, one end of the first case 600 is supported by the inner surface (or bottom) of the coupling groove 250a of the coupling part 250. Therefore, the coupling of the second case 200 and the first case 600 may be accomplished more sturdily. The depth of the coupling groove 250a is substantially the same as the thickness of the one end of the first case 600 inserted thereinto. Therefore, the one end of the first case 600 fits into the coupling groove 250a, and the surface of the first case, which is parallel to the top surface of the bare cell, is smoothly matched to the surface of the coupling part 250 on which the coupling groove 250a is formed, so that a projected portion is not generated at the coupling portion between the first case 600 and the second case 200. As a result, the first case 600 and the second case 200 can be smoothly coupled.

The first lead tab 300 electrically connects the electrode terminal 110 of the bare cell 100 to the PCM 230. In other words, one and another ends of the first lead tab 300 are electrically connected to the electrode terminal 110 of the bare cell 100 and the PCM 230, respectively.

The second lead tab 400 electrically connects the outer surface of the bare cell 100 to the PCM 230. In other words, one and another ends of the second lead tab 400 are electrically connected to the outer case of the bare cell 100 and the PCM 230, respectively.

In the present embodiment, it illustrates, by way of example, the case where the electrode terminal 110 of the bare cell 100 is a negative electrode and the outer surface of the bare cell 100 is a positive electrode, but the present invention is not limited thereto.

The insert injection molding may be performed on the second case 200 and the PCM 230 in the state that ends of the first and second lead tabs 300 and 400 are connected to the PCM 230. Also, it is possible that the first and second lead tabs 300 and 400 may be connected to the PCM 230 in the state that the second case 200 and the PCM 230 is integrally formed by the insert injection molding.

The first lead tab 300 and the second lead tab 400 are extended in parallel along the top surface of the bare cell 100 from the PCM 230. The extended first and second lead tabs 300 and 400 may be formed to be connected to the electrode terminal 110 and the top surface of the bare cell 100, respectively. At this time, the first and second lead tabs 300 and 400 have different polarities, so that the first and second lead tabs 300 and 400 are provided with an insulating layer for preventing short circuit. As shown in FIG. 3, the insulating layer 320 may be formed by applying an insulation material to the first lead tab 300. An insulating layer can be formed on the second lead tab 400 in the same manner as the first lead tab 300. Also, as another configuration of the insulating layer, as shown in FIG. 4, an insulating layer 420 may be formed by integrally wrapping the first and second lead tabs 300 and 400 but separating the first lead tab 300 from the second lead tab 400.

The connection portion of the first lead tab 300 or the second lead tab 400 to terminal part 310 or 410 is formed with a bending section to better prevent the short circuit therebetween. Each one end of the first lead tab 300 and the second lead tab 400 which are coupled to the electrode terminal 110 of the bare cell 100 or on the surface of the bare cell is connected to an enlarged width of terminal part 310 or 410. Because the terminal parts 310 and 410 have widths larger than those of the first and second lead tabs 300 and 400, the chance of the contact therebetween is high. Therefore, one of the first and second lead tabs 300 and 400 is provided with a bending section so that the terminal part 310 of the first lead tab 300 and the terminal part 410 of the second lead tab 400 are more far spaced away by means of the bending section, making it possible to prevent the contact therebetween. The present exemplary embodiment illustrates, by way of example, the structure that the bending section 405 is formed in the second lead tab 400.

While the three surfaces of the bare cell 100 are covered by the second case 200 and the first case 600, a label 700 (shown in FIG. 8) is attached to wrap the remaining surfaces of the bare cell 100. With the label 700, the outer surface of the bare cell 100 is insulated and the outer surface of the bare cell 100, which is formed of metallic material, is not directly exposed so that an appearance of the secondary battery 1 becomes more attractive. Also, the label 700 covers the side wall part 220*b* of the second case 200 and the side wall part 660*b* of the second case 200, which are partly overlapped with the two wide front and back surfaces of the bare cell so that the second case 200 and the first case 600 are supported by the adhesive strength of the label 700, and the coupling force between the bare cell 100 and the two cases 200 and 600 is improved.

The present exemplary embodiment describes, by way of example, that the bare cell 100 is formed in a rectangular parallelepiped shape or a shape similar thereto. That is, the bare cell 100 of this exemplary embodiment has four narrow surfaces (top, bottom, and two side surfaces), and two wide surfaces (front and back surfaces), and the electrode terminal 110 is formed on the top surface. The first case 600 covers the top surface that is provided with the electrode terminal 110, and the second case 200 covers the bottom surface that faces the top surface, and also covers one of the side surfaces, and any one of the long sides. The shape of the bare cell 100 of the present invention is an example of a general form of a built-in battery pack called the inner pack, but the present invention is not limited thereto.

Hereinafter, an assembly process of the secondary battery configured as above will be described with reference to FIGS. 5 to 8. The assembly process described below is only one example and the present is not limited thereto. The configuration of the secondary battery according to the present invention may be made by several modified assembly processes.

FIG. 1 shows a secondary battery of the present invention before the bare cell is coupled to the second case and the first case. FIG. 2 shows the second case integrally formed with the protective circuit module (PCM) through the insert injection molding. Herein, the PCM 230 may be integrally formed with the second case 200 after the first and the second lead tabs 300 and 400 are connected to the PCM 230. Alternatively, after performing the insert injection molding on the PCM 230 and the second case 200, the PCM 230 integrally formed with the second case 200 can be connected to the first and second lead tabs 300 and 400.

Figure 5:
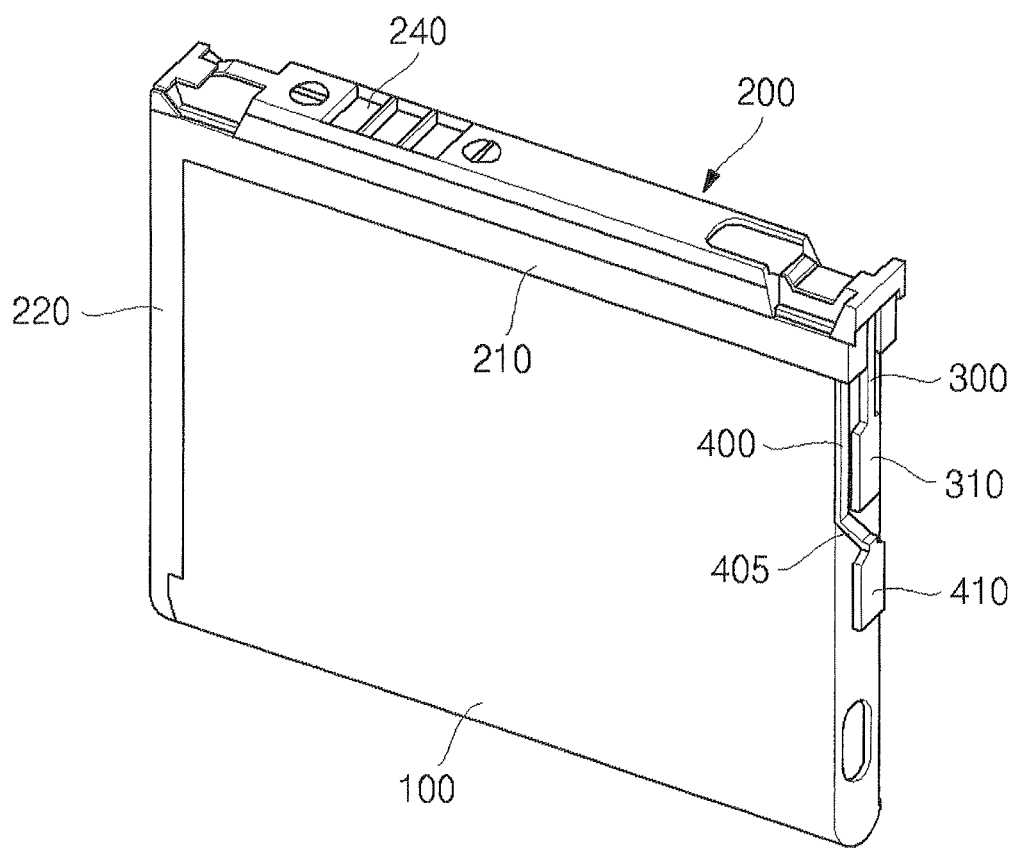
FIGS. 5 to 8 are perspective views showing an assembly process of the secondary battery in sequence according to the exemplary embodiment of FIG. 1.
Figure 6:
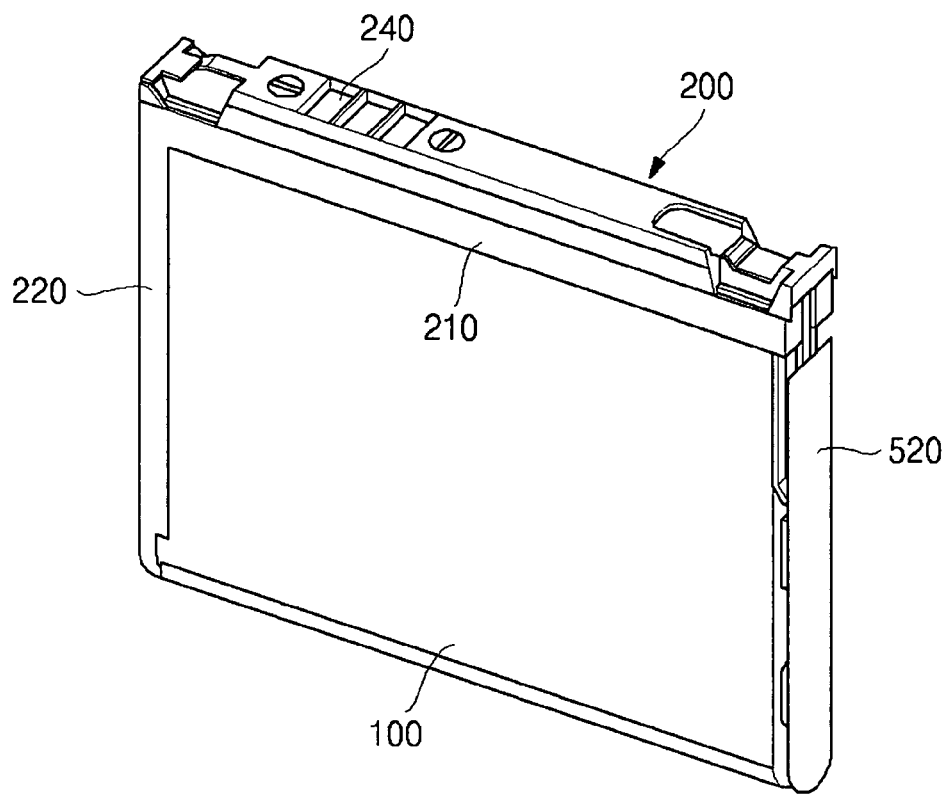
Figure 7:
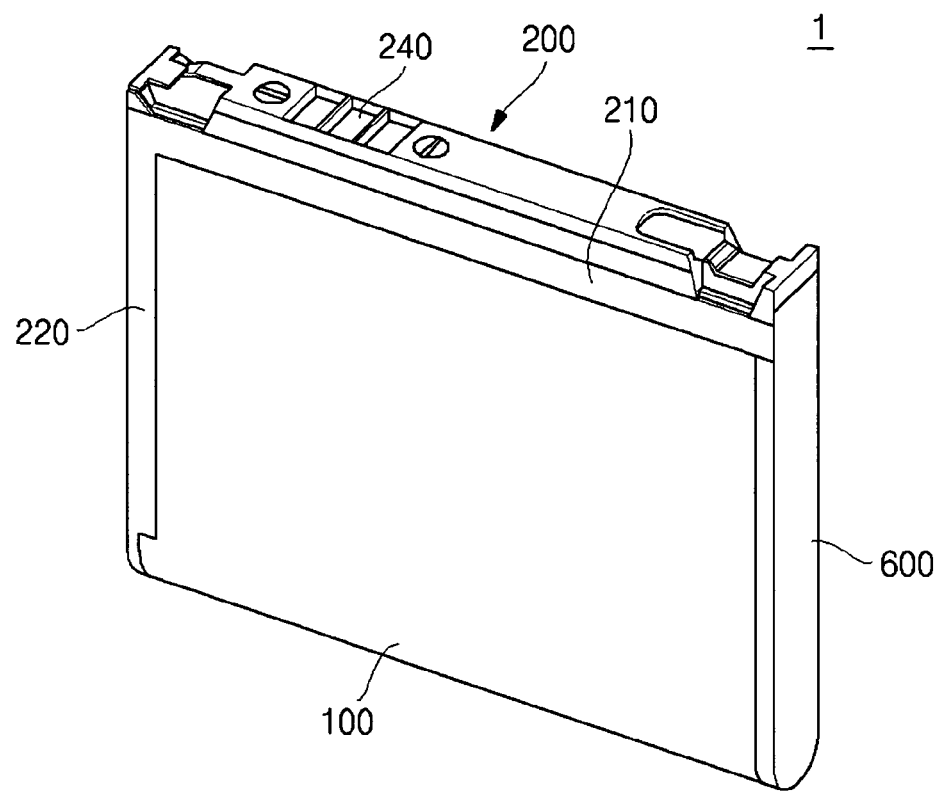

The second case 200 integrally formed with the PCM 230 is coupled to the bare cell 100. At this time, the coupling of the bare cell 100 and the second case 200 is made by means of the double-sided tape 510 that is attached on the bottom surface of the bare cell 100. FIG. 5 shows a state in which the second case 200 is coupled to the bare cell 100. In order to couple the first case 600 to the bare cell 100, the top surface provided with the electrode terminal 110 of the bare cell 100 is attached with the double-sided tape 520 as shown in FIG. 6. The first case 600 is coupled to the bare cell 100 by means of the adhesive strength of the double-sided tape 520, as shown in FIG. 7. At this time, one end of the first case 600 is inserted into the coupling groove 250*a* formed in the connection portion 250 of the second case 200 so that the connection portion of the first case 600 and the second case 200 does not have any projected portion. As a result, the connected side of the first case and the second case, which are substantially parallel to the top surface, is evenly connected forming a plane.

Figure 8:
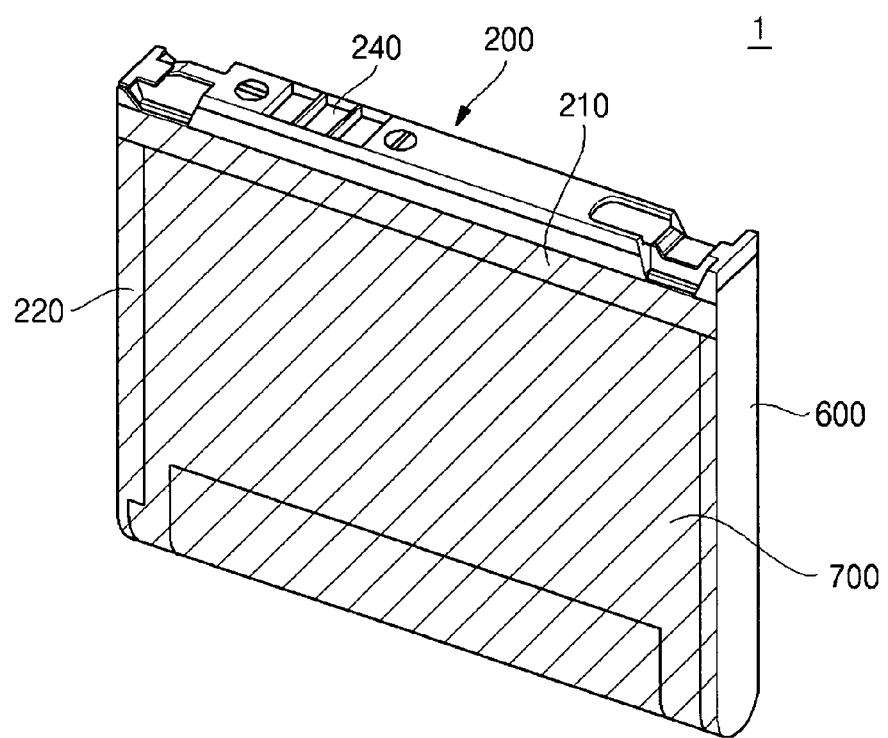

Finally, the label 700 is attached to wrap the two wide front and back surfaces of the bare cell 100 and the another side surface that is not covered by the cases 200 and 600 so that the completed secondary battery is formed as shown in FIG. 8.

As described above, in the secondary battery 1 of the present invention, the coupling of the protective circuit module (PCM) including the protective circuit board and the bare cell is accomplished in a mechanical manner. Therefore, even when the assembly of the bare cell and the PCM is defective, they can easily be disassembled and then reassembled. And, since the bare cell and the PCM can be well arranged and then connected at a first try or at a second try if necessary, an external shape is smooth, and the connection of the bare cell and the PCM is stable. The stable connection can be achieved through a rework, if necessary.

As can be appreciated from the embodiments, with the secondary battery according to the present invention, the coupling structure including the electrical connection of the bare cell and the PCM is made through the assembly manner so that the assembly work of the secondary battery is easily made as well as if necessary, the disassembly and reassembly work of the bare cell and the PCM can easily be made.

The bare cell and the PCM are made in the assembly manner through the separately manufactured cases so that the defect rate after completion may be considerably reduced.

And, since the arrangement between the PCM including the protective circuit board and the bare cell is not deformed in the packing process through which the PCM and the bare cell are coupled, the structural integrity of the secondary battery is improved and the secondary battery with the improved structural integrity reduces risk factors such as deformation while being used so that the risk of the occurrence of the internal short circuit or other abnormal malfunction reduces, making it possible to improve the structural stability.

The above description is only one embodiment for implementing the liquid crystal display according to the present invention, and thus the present invention is not limited thereto. Accordingly, it would be appreciated by those skilled in the art that changes might be made in this embodiment without departing from the principles and spirit of the invention, the scope of which is defined in the claims and their equivalents.

What is claimed is:

1. A secondary battery comprising:
   a bare cell for producing electricity, the bare cell including a top surface, a bottom surface facing the top surface, and a first side surface;
   an electrode terminal formed on the top surface, the electrode terminal having a polarity, the top surface of the bare cell having another polarity different from the polarity of the electrode terminal, the electrode terminal being electrically insulated from the top surface of the bare cell;
   a first case covering the top surface and the electrode terminal, the first case not covering the bottom surface, the first case not covering the first side surface;
   a second case completely covering the first side surface, the second case including a protective circuit module;
   a first lead tab coupling the electrode terminal to the protective circuit module, the first lead tab extending from an end portion of the second case to be connected to the electrode terminal, the first lead tab disposed only on the top surface of the bare cell;

a second lead tab coupling the top surface of the bare cell having said another polarity to the protective circuit module, the second lead tab extending from the end portion of the second case to be connected to the top surface of the bare cell, the second lead tab disposed only on the top surface of the bare cell, both of the first and the second lead tabs being covered by the first case one of the first and second lead tabs including a bending section that shifts said one of the first and second lead tabs away from another of the first and second lead tabs; and an insulating layer formed between the first lead tab and the second lead tab for preventing short circuit between the first and the second lead tabs.

2. The secondary battery as claimed in claim 1, wherein the bare cell includes a second side surface that faces the first side surface, a front surface, and a back surface that faces the front surface, each of the front and the back surfaces being wider than any of the top, bottom, first side, and second side surfaces.

3. The secondary battery as claimed in claim 2, wherein the second case comprises:
    a first case part covering the first side surface; and
    a second case part covering the bottom surface of the bare cell.

4. The secondary battery as claimed in claim 3, wherein the second case part comprises:
    a base part that is substantially parallel to the bottom surface; and
    a side wall part that is substantially parallel to the front surface, the side wall part of the second case part covering an edge portion of the front surface.

5. The secondary battery as claimed in claim 2, wherein the first case comprises:
    a base part that is substantially parallel to the top surface; and
    a side wall part that is substantially parallel to the front surface, the side wall part of the first case covering an edge portion of the front surface.

6. The secondary battery as claimed in claim 2, wherein each of the first and second lead tabs extends substantially parallel to the top surface.

7. The secondary battery as claimed in claim 1, wherein the insulating layer is formed to enclose the first lead tab.

8. The secondary battery as claimed in claim 6, wherein the insulating layer is formed to enclose both of the first and the second lead tabs, the insulating layer separating the first lead tab from the second lead tab.

9. The secondary battery as claimed in claim 3, further comprising a label that covers the front and the back surface of the bare cell.

10. The secondary battery as claimed in claim 9, wherein the label covers a portion of the first case and a portion of the second case.

11. The secondary battery as claimed in claim 1, wherein the protective circuit module is mounted in an inner side of the second case through an insert injection molding.

12. The secondary battery as claimed in claim 1, wherein the second case is coupled to the bare cell by a double sided tape.

13. The secondary battery as claimed in claim 1, wherein the first case is coupled to the bare cell by a double sided tape.

14. The secondary battery as claimed in claim 1, wherein the second case is connected to the first case.

15. The secondary battery as claimed in claim 14, wherein the second case comprises a coupling part formed at one end of the second case, the coupling part having a coupling groove, the depth of the coupling groove is substantially the same as a thickness of one end of the first case, the second case being connected to the first case in a manner that the one end of the first case fits into the coupling groove of the second case.

* * * * *